United States Patent Office
3,730,748
Patented May 1, 1973

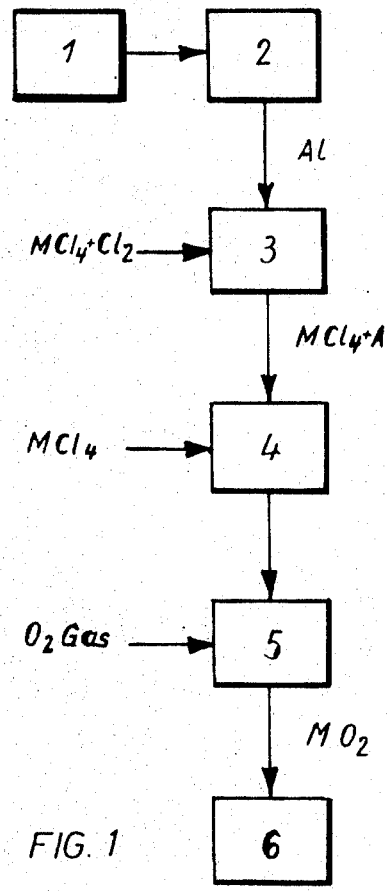
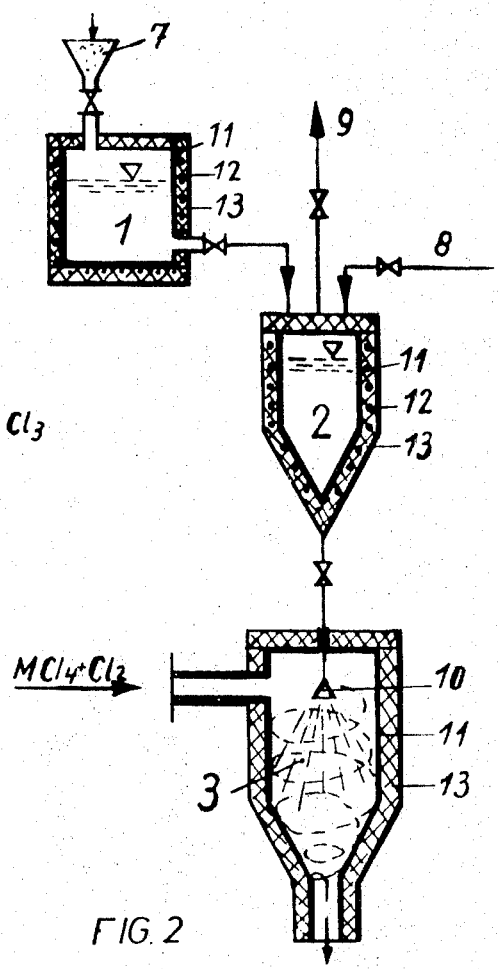
FIG. 1
FIG. 2

3,730,748
PRODUCTION OF MIXED OXIDES CONTAINING ALUMINUM OXIDE
Günter Lailach and Gottfried Gerlach, Krefeld, Gerhard Trenczek, Krefeld-Uerdingen, and Karl Brandle, Krefeld, Germany, assignors to Farbenfabriken Bayer Aktiengesellschaft, Leverkusen, Germany
Filed Feb. 17, 1971, Ser. No. 115,948
Claims priority, application Germany, Mar. 5, 1970,
P 20 10 357.5
Int. Cl. C08h 17/04
U.S. Cl. 106—288 B        10 Claims

ABSTRACT OF THE DISCLOSURE

This invention relates to a process for the production of mixed oxides by reacting the tetrachlorides of silicon, titanium, tin or zirconium, or mixtures thereof, and aluminum trichloride in the gas phase with an oxygen containing-gas at temperatures above 900° C., the metal tetrachloride/aluminum trichloride mixture required for the reaction being prepared in such a way that all the heat of reaction liberated during chlorination of the aluminum is utilized, and that, furthermore, any solid secondary products resulting from the chlorination of the aluminum do not need to be removed.

---

This invention relates to the reaction of aluminum with chlorine contained in a gaseous mixture with a metal tetrachloride to form a mixture of the tetrachloride and aluminum trichloride suited for conversion to mixed oxides.

It is known that the combustion of titanium tetrachloride, for example, can be carried out in the presence of aluminum compounds, preferably aluminum trichloride. The delivery of aluminum trichloride to the reaction mixture is initiated by separately preparing the aluminum trichloride and then mixing it with the titanium tetrachloride.

The chlorination of aluminum with chlorine is a highly exothermic reaction. Hitherto, because of the corrosive properties of the reactants which make it necessary to line the reaction vessels with an inert, thermally almost non-conductive material, it has proved difficult to dissipate the heat of reaction so quickly as to avoid damage to the reactors through corrosion and the formation of aluminum monochloride.

Addition of the aluminum trichloride to the metal tetrachloride to produce a vapor mixture with temperatures of at least 500° C. also involves a number of difficulties, not the least of which is the problem of corrosion referred to above.

Some of the problems are solved by carrying out the chlorination of the aluminum in a fluidized bed of aluminum and inert material with a mixture of chlorine and inert gas, titanium tetrachloride in particular, as described for example in U.S. patent specification No. 2,790,704. The difficulties of this process are attributable to the fact that, on the one hand, the temperature of the fluidized bed should not exceed 400° C. because of the danger of caking, and that on the other hand titanium tetrachloride is not really inert but can be reduced by the aluminum present in excess into lower titanium chlorides which are solid at temperatures below 400° C. (cf. Ruff and Neumann, Z. anorg. allgem. Chem. 128, 84 [1923]). In addition, this process involves the step of dust extraction.

It is accordingly an object of the invention to provide a process for the production of a mixture of aluminum trichloride and a metal tetrachloride without corrosion of the reactor.

It is a further object of the invention to provide a process for producing a mixture of aluminum trichloride and a metal tetrachloride and for converting such mixture to the mixed oxides of aluminum and said metal with minimal corrosion of the reactors wherein such process takes place.

These and other objects and advantages are realized in accordance with the present invention wherein finely divided aluminum is reacted with an excess of chlorine contained in a gaseous mixture with the tetrachloride of at least one of silicon, titanium, tin and zirconium, the gaseous mixture being heated to at least about 140° C., the reactants being supplied in such proportions and at such temperatures that the exothermic heat of reaction in forming aluminum trichloride does not permit the temperature of the gaseous product stream to rise above about 900° C. The resulting gaseous product stream is then reacted with an oxygen-containing gas at a temperature in excess of about 900° C. to produce the mixed oxides of aluminum and of the metal contained in said tetrachloride.

Surprisingly, the problem outlined above is readily solved by the measures according to the invention. The finely divided aluminum is chlorinated in a mixture of chlorine gas and metal tetrachloride vapor, contact between the metallic aluminum and the walls of the reactor being avoided by suitably guiding the gas streams so that the entire heat of reaction is used to heat the aluminum trichloride/metal tetrachloride vapor mixture. By suitably selecting the concentrations, it is possible to obtain vapor mixtures in a temperature range in which, on the one hand, the reactor walls are not corroded while, on the other hand, the vapor mixture can be introduced directly, i.e. in the absence of additional heating, into the combustion installation for producing the mixed oxides. The concentration of the aluminum trichloride in the aluminum trichloride/metal tetrachloride mixture is determined by the measured introduction of aluminum. The aluminum is advantageously introduced by spraying a pure slag-free melt. An excess of chlorine prevents the formation of lower metal chlorides, for example, titanium trichloride or tin dichloride, which, because of their relatively high sublimation to temperature, might have given rise to difficulties in the form of blockages in the pipe lines.

In one preferred embodiment of the process, a metal tetrachloride/chlorine mixture which does not contain any zirconium tetrachloride is introduced into a reactor lined with an inert material at a temperature of at least about 140° C. and under the pressure of the surrounding atmosphere or under elevated pressure. Mixtures containing zirconium tetrachloride have to be pre-heated to at least about 340° C.

Aluminum is fused in a container in which both the relatively heavy impurities and also the relatively light impurities immiscible with the melt, for example, aluminum oxide, can be removed from the melt. The slag-free melt is introduced through nozzles or other suitable atomizing units into the metal tetrachloride/chlorine mixture flowing through the reactor. Single-component nozzles and also two-component nozzles can be used as the nozzles. In the case of two-component nozzles, an inert gas which does not interfere with the chloride combustion process, advantageously the particular metal tetrachloride used, is used as the expanding agent. The chlorine content of the metal tetrachloride/chlorine mixture should be such that, after the aluminum which has been sprayed in has been completely chlorinated into aluminum trichloride, an excess of chlorine is present in order to avoid the formation of lower metal chlorides.

The advantages of the controllable increase in the temperature of the mixture during chlorination, by which the problems of corrosion attending other processes are avoided, are causally associated with the relatively high molar heat of the metal tetrachloride vapor. Table 1 illustrates the relationship between the possible concentration ratios and the increase in temperature with reference to the example of titanium tetrachloride:

TABLE 1

| Conversion, g. of Al/kg. TiCl$_4$ | Percent by volume of Cl$_2$ [a] | Percent by weight of Al$_2$O$_3$ [b] | Increase in the temperature of the gas mixture during Al chlorination (° C.) |
|---|---|---|---|
| 1 | 1.05 | 0.45 | 38 |
| 2 | 2.07 | 0.9 | 76 |
| 5 | 5.00 | 2.2 | 185 |
| 10 | 9.55 | 4.3 | 360 |
| 15 | 13.67 | 6.4 | 525 |

[a] In the TiCl$_4$-Cl$_2$ mixture required for converting 2Al+3Cl$_2$→2AlCl$_3$.
[b] In the TiO$_2$ formed during combustion.

Tests in which the process according to the invention has been carried out have shown that the temperature of the metal tetrachloride/chlorine mixture is best kept above about 250° C. and below about 600° C. because of the increase in temperature attributable to the heat of reaction and the danger of corrosion which begins at elevated temperatures. In addition, it has proved to be of advantage to spray in the aluminum as finely as possible and in such a quantity that, on completion of the reaction, the temperature still does not reach the temperature at which corrosion occurs in the reactor. It has been found that the higher the concentration of aluminum trichloride in the gas mixture on completion of chlorination the lower is the excess of chlorine required. Accordingly, it is preferred to work with an AlCl$_3$ concentration of from about 1 to 15% by volume, and preferably from about 5 to 15% by volume. If the concentration of aluminum trichloride obtained in this way is too high for example for combustion to form titanium dioxide pigments, the aluminum trichloride/titanium tetrachloride mixture can be mixed with titanium tetrachloride vapor of suitable temperature in a mixing chamber lined with an inert material in such a way that a combination of the concentration and temperature required for combustion is obtained.

The aluminum chlorination process according to the invention can also be carried out by introducing aluminum powder into the metal tetrachloride/chlorine gas mixture instead of spraying in liquid aluminum. However, apart from the higher costs of aluminum powder, this method has the particular disadvantage that aluminum powders are always contaminated by oxide layers on the particles. As a result, the particles react less effectively and the oxide residues left on completion of chlorination present the danger of contamination to the apparatus and for this reason necessitate the installation of dust extractors. However, one of the advantages of the process according to the invention is the very fact that, in cases where liquid aluminum is used, neither the aluminum used for chlorination nor the aluminum chloride formed is exposed to the danger of contamination through oxygen compounds of the kind formed on contact with air or moisture.

The invention will be further described with reference to the accompanying drawings wherein:

FIG. 1 is a schematic flow sheet of the overall process;

FIG. 2 is a schematic sectional view through the equipment to produce the aluminum trichloride-metal tetrachloride gaseous mixture;

Figure 3:
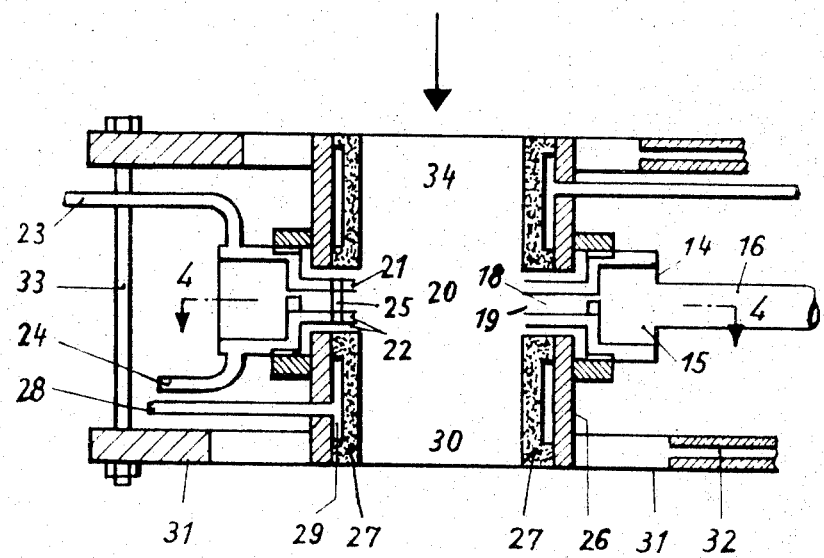
FIG. 3 is a vertical section through a reactor for reacting the gaseous mixture produced in FIG. 2 with oxygen to form the mixed oxides.

Referring now more particularly to the drawings, in the flow sheet of FIG. 1, aluminum is fused in the melt vessel 1. The heavy slags can accumulate at the bottom of this vessel and the light slags on the melt itself, while the slag-free melt is transferred laterally either into a pressure vessel or a pump 2. The melt is then introduced through an atomizing unit into a chlorinator 3, in which the aluminum particles react with a metal tetrachloride/chlorine gas mixture, for example introduced tangentially, to form aluminum trichloride. The metal tetrachloride/aluminum trichloride mixture issuing from the chlorinator 3 can be mixed in a mixing chamber 4 with more metal tetrachloride to adjust the concentration of aluminum trichloride required for combustion. The gases issuing from the mixing chamber 4 are reacted with an oxygen containing-gas, e.g. pure oxygen or air in a device 5 to form oxides and chlorine. The oxides are separated off from the gas stream in a separator 6.

The aluminum chlorination process is carried out for example in an arrangement of the kind shown in FIG. 2 wherein the aluminum is introduced from a hopper 7 into the melting vessel 1 in which it is fused. The pure melt flows into the pressure vessel 2 from which it is discharged, under pressure of an inert gas supplied at 8, through a nozzle 10 into the chlorinator 3. The pressure in the vessel 2 is regulated by a relief valve 9. The finely divided aluminum is reacted with a metal tetrachloride/chlorine mixture in the chlorinator 3. All three units are provided with a ceramic lining 11 and an insulating layer 13 into which an electrical heating means 12 is installed in the case of the vessels 1 and 2.

Reaction of the halides with oxygen or gases containing oxygen is preferably carried out in the device 5 of the kind shown in FIG. 3. This arrangement of a mixing chamber for mixing pre-heated oxygen or gases containing oxygen with pre-heated metal chloride mixtures is as follows:

A distributor plate 14 is centrally arranged. The distributor 14 has an outer annular distribution zone 15 into which the component to be reacted is radially or tangentially introduced through a feed pipe 16. The component passes through a gate 17 with numerous openings therein into an annular gap 18, entering the mixing chamber 20 at 19. Above and below the inlet for the reactants there are further annular gaps 21 and 22 through which chlorine or another gas inert with respect to the reaction is intoduced. The inert gas is supplied through the pipes 23 and 24. Spacer members 25 can be fitted into all the annular gaps.

Identical components are situated above and below the distributor plate, so that it will be sufficient to describe one section. It consists of a metal cylinder 26 lined internally with a porous material 27. The inert gas is delivered under pressure through a pipe 28 into an annular zone 29 and then flows through the pores in the wall 27 into the reaction zone 30. At one end, the metal cylinder carries a hollow flange 31 which chan be cooled. The cooling liquid can be introduced and discharged through ports 32. The mixing chamber is held together by tightening screws 33. The hot oxidizing gas enters at 34 in the direction indicated by the arrow.

Figure 4:
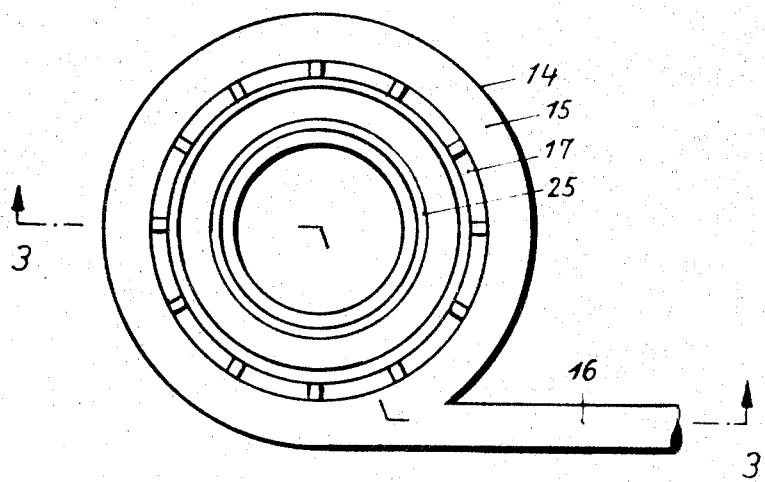
FIG. 4 is a section taken along line 3—3 of FIG. 3.

FIG. 4 is a section through the chamber shown in FIG. 3 on the line 3—3, and shows the distributor zone 15, the gate 17, the annular gap 18 with the spacer members 25 and the feed pipe 16 which is tangential in this embodiment.

The mixing chamber and reaction chamber of this arrangement are described in Belgian patent specification No. 715,359. It enables the reaction components to be mixed on the cross-flow principle, in which case one or both component streams is or are simultaneously surrounded by an inert gas mist.

The suitably pre-heated aluminum trichloride/metal tetrachloride mixture is introduced into the distributor, preferably made of metal, in which an annular duct, a slotted gate for uniformly distributing the gas and finally an annular gap or nozzles radiating from the annular gap for introducing the gas into the mixing chamber, are formed. In the mixing and reaction zone, the uniform gas stream (in the case of an annular gap) or the gas streams (in cases where nozzles are used) meet the second gaseous component introduced vertically downwards, the oxygen or the oxygen-containing gas, also in pre-heated form, at an angle of 90° or approximately 90° thereto.

The components can be pre-heated in any way, for example in the usual way by means of heat exchangers or heating elements.

An auxiliary gas can also be burnt in a preceding combustion chamber. In addition, it is also possible to use electrical systems such as for example a resistance bed, an arc, a plasma burner or high frequency induction.

Gases which do not take any part in the reaction proper under the reaction conditions, such as for example nitrogen or chlorine, optionally in admixture with carbon nonoxide or carbon tetrachloride, are used as the inert gases.

The mixing chamber is adjoined by the actual reaction tube or residence-time chamber in which the required physical properties of the oxides are adjusted in fractions of a second. On leaving the residence-time chamber, the reaction products are chilled by the introduction of cold gas. After the reaction mixture has been further cooled, the gaseous and solid reaction products are separated from one another, the solid oxides being preferably collected in an aqueous suspension. The suspension is worked up into the finished pigment by the usual methods.

The process according to the invention is illustrated by the following examples.

EXAMPLE 1

Aluminum powder was chlorinated in a mixture of titanium tetrachloride and chlorine in a laboratory apparatus of quartz glass. A gas stream consisting of 360 ml./h. of titanium tetrachloride vapor and 55 ml./h. of chlorine gas, heated to 350° C., flowed vertically upwards in a 45 mm. diameter reaction tube. 33.2 g./h. of aluminum powder were introduced into this gas stream by means of a gas stream of 40 ml./h. of argon. The reaction took place in the gas stream as it flowed through a 32 mm. wide insulated quartz tube inclined at 60° to the horizontal. The average residence time in the reaction zone was approximately 1.2 seconds. An increase in temperature to 600° C. was observed in the reaction zone. Condensation of the reaction product was accompanied by the precipitation of solid aluminum chloride in the liquid titanium tetrachloride. At the end of the test, it was possible to isolate 0.77% of the aluminum used in the form of aluminum oxide, together with unreacted metallic aluminum.

EXAMPLE 2

A mixture heated to 300° C. of 34 m.$^3$/h. of titanium tetrachloride vapor corresponding to 86 liters per hour of liquid titanium tetrachloride, and 2.5 Nm.$^3$/h. of chlorine gas corresponding to 12.37% by volume of the mixture, was introduced into a reactor 3 of the kind shown in FIG. 2 which had an internal diameter of 500 mm. and a length of 1000 mm., and was lined with an inert material. At the same time, 1.4 kg./h. of liquid aluminum were sprayed in under a pressure of 6 atms. through the single-component nozzle 10 with a bore diameter of 0.3 mm. The chloride excess amounted to 38%, based on the quantity of chlorine consumed during the chlorination of aluminum. The average residence time in the reactor was 14 seconds. In the case of continuous operation, a temperature of 620° C. was measured in the issuing reaction mixture. It was not possible to detect any aluminum oxide, unreacted aluminum or titanium trichloride, or any signs of damage through corrosion in the reactor and pipe system on completion of the test.

The aluminum trichloride/titanium tetrachloride mixture issuing from the chlorination reactor 3 was passed as shown in FIG. 1 through a mixing chamber 4 lined with an inert material in which 58 m.$^3$/h. of titanium tetrachloride vapor, corresponding to 117 liters per hour of liquid titanium tetrachloride, were mixed with the stream entering from the reactor 3. The titanium tetrachloride vapor had been preheated to 410° C. in an electric superheater following the evaporator. The aluminum trichloride/titanium tetrachloride mixture issuing from the mixing chamber 4 with a temperature of 500° C. was converted into the oxide in a device 5 of the kind shown in FIG. 3.

The chloride mixture entered the distributor plate at 15, was distributed in the distributor zone 15, passed the gate 17 through a number of slots and flowed through the annular gap 18 into the mixing chamber 20. Oxygen in a ratio of 1.3:1, based on the TiCl$_4$, was preheated to 700° C. and the gas was further heated by burning a fuel in the stream of oxygen, and thereafter introduced into the mixing chamber at 34 and mixed with the chloride stream at 20. The oxygen was heated to such a high temperature that a temperature of 1040° C. was calculated for the mixture of the reaction gases without making any allowance for the heat of reaction. 1.5 Nm.$^3$/h. of chlorine were introduced through each of the pipes 23 and 24, entering the mixing chamber through the annular gaps 21 and 22. During the test, the porous walls 27 were rinsed with chlorine introduced under pressure through the walls from the annular zone 29.

The concentration of TiCl$_4$ in the reaction mixture amounted to 27% by volume.

The product obtained was titanium dioxide rutile in pigment-fine distribution. It contained 1.8% by weight of aluminum oxide. The pigment properties were extremely good. The pigment had a brightening power according to DIN 53192 of 840 units and a Reynolds number of 1775. The most frequent particle size was approximately 0.242$\mu$ in a particle size distribution s g.=1.41. The pigment had an excellent covering power, coupled with outstanding whiteness.

EXAMPLE 3

A mixture heated to 275° C. of 42 m.$^3$/h. of tin tetrachloride vapor, corresponding to 13 liters per hour of liquid tin tetrachloride, and 3.0 Nm.$^3$/hour of chlorine gas was introduced into a reactor 3 as described in Example 2. At the same time, 1.75 kg./hour of liquid aluminum were sprayed in under a pressure of 6.5 atms. through a single-component nozzle 10 with a bore diameter of 0.3 mm. The average residence time in the reactor was 11.5 seconds and the temperature of the issuing reaction mixture was 600° C.

On completion of the test, there were no signs of any deposits or damage through corrosion either in the reactor or in the pipe systems.

The chloride mixture issuing from the chlorination reactor 3 was directly introduced into the arrangement shown in FIG. 3 for combustion. The chloride mixture entered the distributor zone 15 through the pipe 16, passed through the gate 17 and flowed through the annular gap 18 into the mixing chamber 20.

Superheated oxygen-containing gas containing 25 Nm.$^3$h. of oxygen was introduced at 34 and mixed with the chloride stream at 20. The temperature of the oxygen-containing gas was so high that a temperature of 1030° C. was obtained in the mixing zone.

At the same time, 1 Nm.$^3$/h. of chlorine was introduced through each of the pipes 23 and 24, entering the mixing chamber through the annular gaps 21 and 22. The porous walls were rinsed with chlorine as in Example 2.

The product formed consisted of 2.3% by weight of aluminum oxide and 97.7% by weight of tin dioxide. The white mixed oxide was finely divided.

It will be appreciated that the instant specification and examples are set forth by way of illustration and

What is claimed is:

1. In the production of the mixed oxides of aluminum and at least one metal selected from the group consisting of silicon, titanium, tin and zirconium by forming a mixture of aluminum trichloride and the tetrachloride of said metal and reacting said mixture with oxygen, the improvement which comprises forming said mixture by heating a gaseous stream of said tetrachloride and chlorine to a temperature of at least about 140° C., and introducing metallic aluminum into said gaseous stream, the chlorine being provided in excess of the amount required for reaction with the aluminum and their rates of feed being adjusted so that the temperature of the resulting mixture of aluminum trichloride and tetrachloride does not rise above about 900° C.

2. Process according to claim 1, wherein the tetrachloride is that of at least one of silicon, titanium and tin and the temperature of its initial gaseous mixture with chlorine ranges between about 250 and 600° C.

3. Process according to claim 1, wherein the tetrachloride is that of zirconium, optionally along with at least one of silicon, titanium and tin, and the temperature of its initial gaseous mixture with chlorine ranges between about 340 and 600° C.

4. Process according to claim 1, wherein liquid aluminum is sprayed into the gaseous mixture of tetrachloride and chlorine, the relative proportions of aluminum and gaseous mixture being such that the resulting aluminum trichloride comprises about 1 to 15% by volume of the gaseous product stream.

5. Process according to claim 4, wherein the relative proportions of aluminum and gaseous mixture are such that the resulting aluminum trichloride comprises about 5 to 15% by volume of the gaseous product stream.

6. Process according to claim 1, wherein the metallic aluminum is supplied to a reactor in which it is to be chlorinated in such manner that it does not contact the reactor wall.

7. Process according to claim 1, wherein the reaction of said mixture of aluminum trichloride and tetrachloride with oxygen is effected in a chamber whose wall is protected at least in part from the reactants by a blanket of inert gas.

8. Process according to claim 7, wherein the aluminum is sprayed in liquid state into a reactor containing the gaseous mixture of tetrachloride and chlorine in such manner that it does not contact the reactor wall, the relative proportions of aluminum and gaseous mixture being such that the resulting aluminum trichloride comprises about 5 to 15% by volume of the gaseous product stream.

9. The process which comprises reacting aluminum with excess chlorine contained in a gaseous mixture with the tetrachloride of at least one of silicon, titanium, tin and zirconium, the gaseous mixture being heated to at least about 140° C., the chlorine being supplied in excess of the amount required to convert the aluminum to aluminum trichloride, the chlorine and aluminum being supplied in such proportions and at such temperatures that the exothermic heat of reaction in forming aluminum trichloride does not permit the temperature of the gaseous product stream to rise above about 900° C.

10. Process according to claim 9, including the further step of contacting said gaseous product stream with oxygen at a temperature in excess of about 900° C. to produce the mixed oxides of aluminum and of the metal contained in said tetrachloride.

References Cited
UNITED STATES PATENTS 2,790,704  4/1957  Lewis  _____ 106—300

JAMES E. POER, Primary Examiner

U.S. Cl. X.R.

106—299, 300